UNITED STATES PATENT OFFICE.

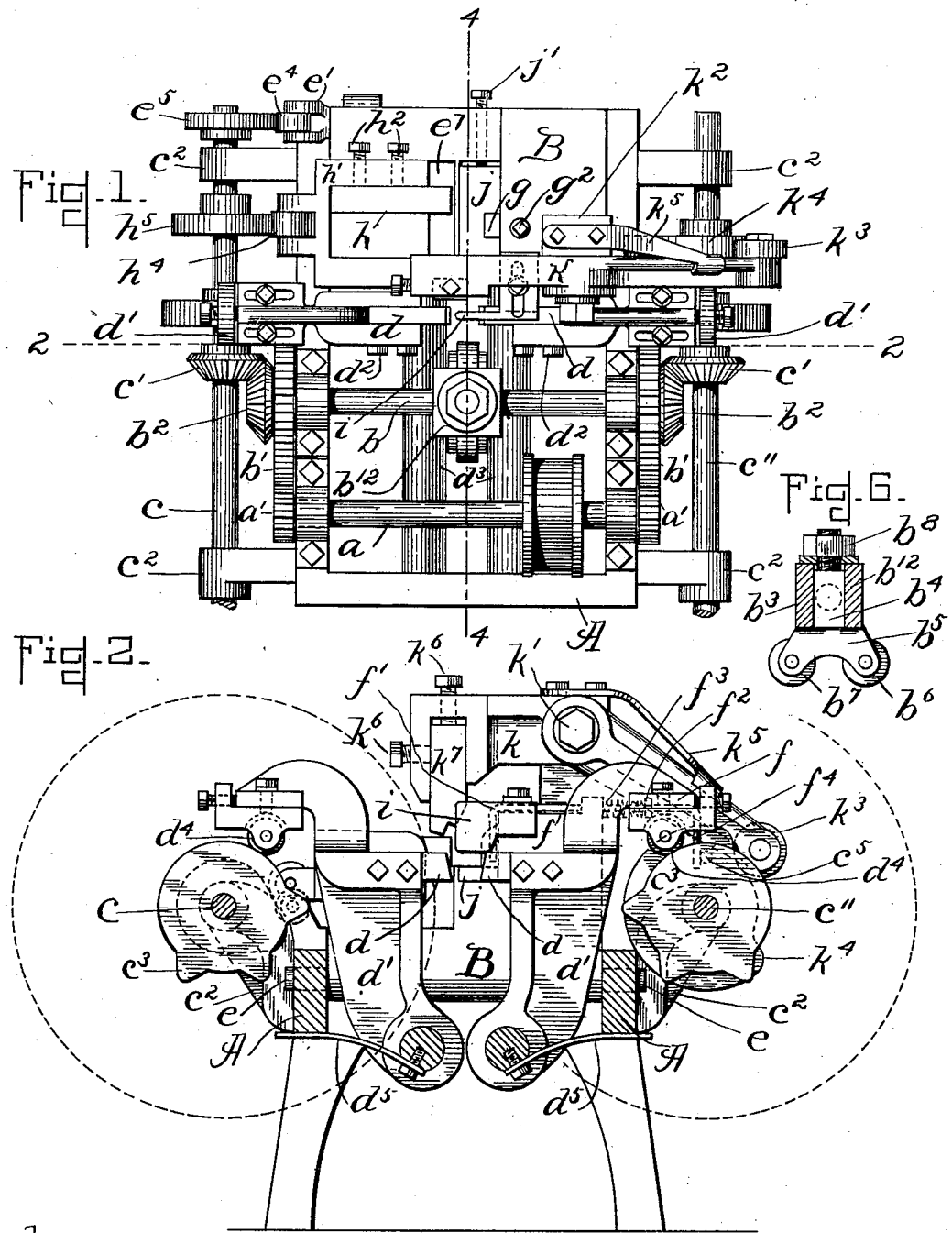

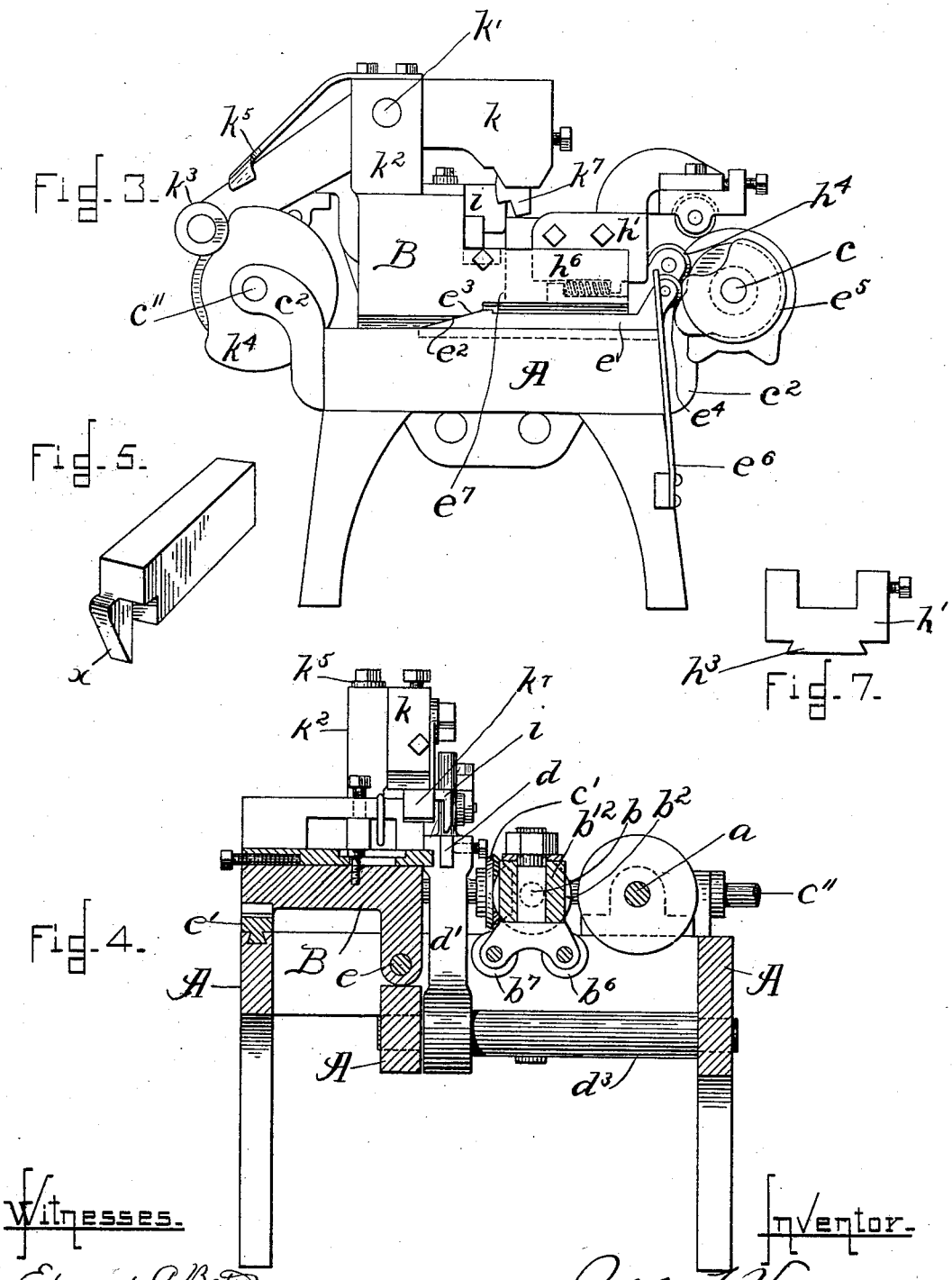

JOSEPH T. VARNEY, OF LYNN, MASSACHUSETTS, ASSIGNOR TO THE SUPERIOR TOE-CALK COMPANY, OF MAINE.

MACHINE FOR MAKING TOE-CALKS FOR HORSESHOES.

SPECIFICATION forming part of Letters Patent No. 599,952, dated March 1, 1898.

Application filed October 16, 1896. Serial No. 609,168. (No model.)

*To all whom it may concern:*

Be it known that I, JOSEPH T. VARNEY, of West Lynn, in the county of Essex and State of Massachusetts, have invented certain new and useful Improvements in Machines for Making Horseshoe Toe-Calks, of which the following is a description sufficiently full, clear, and exact to enable those skilled in the art to which it appertains or with which it is most nearly connected to make and use the same.

This invention has reference to machines for giving initial form to material in the process of manufacturing horseshoe toe-calks, producing such initially-formed toe-calks successively from a bar or strip of metal suited to the purpose.

It is the object of the invention to effect such improvements in horseshoe toe-calk-making machines as will at once enhance their efficiency in the direction of capability of performing more work and doing it in a better manner than by or in machines as heretofore constructed for the same purpose, render them more durable, and simplify and cheapen the cost of their construction.

To these ends the invention consists of the various improvements hereinafter described in detail and then pointed out with particularity in the appended claims.

Reference is to be had to the annexed drawings, and to the letters marked thereon, forming a part of this specification, the same letters designating the same parts or features, as the case may be, wherever they occur.

Of the drawings, Figure 1 is a plan view of a machine for making or forming toe-calks for horseshoes constructed in accordance with my invention. Fig. 2 is a sectional view taken on the line 2 2 of Fig. 1. Fig. 3 is an end elevation. Fig. 4 is a sectional view taken on the line 4 4 of Fig. 1. Fig. 5 is a perspective of a finished or completed initially-shaped toe-calk after having been operated upon or formed by my machine. Figs. 6 and 7 are details.

Proceeding to a description of the construction and operation of my invention, reference is to be had to the accompanying drawings, in which, at A, is shown the frame of the machine, upon which the operative parts are supported.

$a$ designates the main or prime power-shaft, which is journaled in bearings upon the frame A, as shown, and which has fixed thereon the pinions $a'$ $a'$, meshing with gears $b'$ $b'$, which latter are fixed to a shaft $b$, also journaled upon the frame A. Upon the shaft $b$ are mounted the bevel-gears $b^2$ $b^2$ at each end thereof, as shown, which gears mesh with bevel-gears $c'$ $c'$, fixed to shafts $c$ $c''$, journaled in brackets $c^2$ $c^2$, projecting from the frame A. The said shafts $c$ $c''$ are located, as shown, one at each side of the machine.

By the foregoing construction uniform speed of rotation is transmitted from the main or driven shaft $a$ to the counter-shafts $c$, $c''$, and $b$.

The shaft $b$ may be formed or provided with an enlargement $b^{12}$, formed with a square opening $b^3$ therethrough, into which is inserted the square shank $b^4$, formed on a bracket $b^5$, in which latter are mounted the wiping-rolls $b^6$ $b^7$, which will be referred to more fully hereinafter. The extremity of the shank of the bracket $b^5$ is threaded, as shown, to receive the clamping-nut $b^8$, by means of which it may be secured in position. By inserting washers between the block $b^{12}$ and the bracket $b^5$ the rolls may, when necessary, be adjusted with relation to the dies hereinafter referred to, which dies coöperate with the rolls $b^6$ $b^7$ to form the spur upon the calk, all as will hereinafter appear.

The dies are shown at $d$ and are clamped to the swinging lever-arms $d'$ $d'$ by means of bolts $d^2$. The lever-arms $d'$ are mounted upon rock-shafts $d^3$, journaled in the frame A, and are provided at their free ends with cam-rolls $d^4$, which are engaged by the cams $c^3$, mounted upon the shafts $c$ and $c''$, which cams act to thrust the levers inward simultaneously, so that the dies shall engage the stock operated upon in the proper manner. Leaf-springs $d^5$ $d^5$, secured at one end to the rock-shafts $d^3$ and bearing against the frame A at their opposite ends, act to move the levers $d'$ in the opposite direction and hold the rolls $d^4$ $d^4$ in proper contact with their respective cams.

The anvil-frame or frame upon which the stock is supported while it is being operated upon is shown at B and is pivotally mounted at $e$ upon the frame A. The free end of the frame B is supported upon a slide $e'$, which is formed with a cam-surface $e^2$, that engages a cam-surface $e^3$, formed upon the under surface of the anvil-frame B. The outer end of the slide $e'$ has mounted thereon a cam-roll $e^4$, which is engaged by a cam $e^5$, by means of which the slide is moved inward to raise the free end of the anvil-frame B, while a spring $e^6$, engaging the slide $e'$, acts to move the latter in the opposite direction to lower the free end of the frame B, as well as to insure the engagement of the roll $e^4$ with the cam $e^5$. The anvil or frame is normally held in horizontal position, as shown in Fig. 4, but upon the completion of the toe-calk, or after it has been operated upon by the dies and wiping-rolls to form the spur $x$ upon the end, as shown in Fig. 5, and after it is cut off the proper length by the shearing-blades hereinafter described, it is necessary that the spur end be drawn back out of engagement or interference with the dies, so that the finished calk may be discharged conveniently and accurately down through an opening $e^7$, formed by cutting away at that point a portion of the bed of the anvil-frame, or it may be onto a chute or slideway. Therefore I mount the anvil-frame upon a pivot and provide means, as described, for raising and lowering the free end thereof for the purposes set forth, timing the cam so as to operate to shift the slide and allow the free end of the frame to drop immediately after the shearing devices, presently to be described, have operated.

For the purpose of kicking or discharging the finished calk down through the opening $e^7$ I provide a slide $f$, mounted upon the anvil-frame B in such a position as that the depending portion $f'$ will lie or project normally downwardly alongside the stock or calk, and the said slide is provided with a collar $f^2$, between which and the anvil-frame B and upon the said slide is mounted a coiled spring $f^3$, which tends to maintain the slide in its retracted position. A pin or stud $c^5$, mounted upon the face of the cam $c^3$, is arranged to engage with a depending portion $f^4$ to move the slide $f$ forward at the proper time, so that the forward end $f''$ thereof will strike the finished calk and kick the same over so as to fall through the opening $e^7$.

Of the shearing devices the stationary knife or cutter is shown at $g$ and is clamped in position upon the anvil-frame B and within a socket $g'$, formed for the reception of the said cutter, by means of a clamping bolt or screw $g^2$. The movable cutter $h$ is mounted upon a reciprocating carriage or holder $h'$ and clamped in place thereon by clamping screws or bolts $h^2 h^2$. The carriage or holder is shown in detail in Fig. 7 and is formed, as shown, with a dovetail $h^3$, that fits into a groove formed in the bed or top face of the anvil-frame B. A cam-roll $h^4$ is mounted between lugs projecting from the carriage $h'$ and is engaged by a cam $h^5$, whereby the carriage is thrust forward after the dies and wiping-rolls have formed the spur upon the calk, and the finished calk is severed by the cutters $g$ and $h$ from the strip of stock from which the calk is formed. A spring $h^6$ acts to thrust the carriage in the opposite direction.

In order that the strip of stock from which the calk is formed may be presented properly to the dies and wiping-rolls, I provide a stop $i$, which projects down into the path of the end of the strip of stock and against which the latter will abut, so that the dies and wiping-rolls shall engage the said stock to form the spur in the proper manner. The stop $i$ is mounted upon the bed or upper face of the anvil-frame, as shown, and is formed with a slot, a clamping screw or bolt passing therethrough by which it is clamped in position upon the bed or upper face of the anvil-frame. The stop $i$ also acts to draw back the finished calk away from the dies, so that when the anvil-frame swings upon its pivot and the slide $f$ operates it will be the more readily pushed over to the opening $e^7$, through which it falls by gravity.

An adjustable plate $j$ is mounted upon the face of the anvil-frame, having an adjusting-screw $j'$, that is mounted in the anvil-frame, bearing upon one end of the plate $j$, and the opposite end of the plate extends up to the dies, as is shown in Fig. 4, and the said end assists in the formation of the spur upon the calk insomuch as the stock is forced down, over, and against the said end by the wiping-rolls as they engage the end of the stock.

In order that the stock may be clamped firmly and securely in place upon the anvil as it is being operated upon, I provide a lever $k$, pivoted at $k'$ upon a standard $k^2$, projecting from the anvil. One arm of the lever is provided with a cam-roll $k^3$, that is engaged by a cam $k^4$, which cam moves the lever positively in one direction, while a spring $k^5$, mounted upon the standard and engaging that arm of the lever, moves the latter in the opposite direction. The opposite arm of the lever is formed with a head in which is secured, by clamping-screws $k^6$, a block $k^7$, which is shaped at its lower end to fit the shape of the stock, down upon which latter it is forced as the lever is swung upon its pivot by the engagement of the cam $k^4$ therewith.

The cam $k^4$ is timed and shaped so that the lever $k$ will clamp and hold the stock firmly upon the anvil during the operation of forming the spur and severing the finished calk from the strip of stock from which it is formed and is arranged so that the lever will be swung upon its pivot to liberate or free the finished calk just previous to the rocking of the anvil-frame upon its pivot.

The operation of my device is as follows: The strip of stock is fed along the bed or face of the anvil up to and against the stop $i$. The clamping-lever $k$ is moved so as to clamp the strip upon the anvil. The levers $d'$ are thrust forward, causing the dies to engage the stock, and as the said dies are withdrawn the wiping-roll $b^6$ is brought around and engages that portion of the stock engaged by the dies and presses or forces the same down over the edge of the plate $j$, and immediately upon the departure of the roll $b^6$ the dies are again brought up into engagement with the same portion of the stock and then withdrawn, after which the roll $b^7$ passes over the spur being formed and the dies then brought up against the spur and the latter then given a finishing squeeze by the dies, and as the said dies are retracted the movable knife or cutter is operated and the toe-calk completed. Upon the completion of the calk the lever $k$ is disengaged therefrom, the anvil swings upon its pivot, and the slide $f$ being thrust forward the finished toe-calk is discharged from the machine.

If desired or necessary, fly or balance wheels, to employ the momentum of the machine, may be placed upon the shafts $c\,c''$, as indicated by dotted lines in Fig. 2.

Having thus explained the nature of the invention and described a way of constructing and using the same, though without attempting to set forth all of the forms in which it may be made or all of the modes of its use, it is declared that what is claimed is—

1. A machine for making horseshoe toe-calks comprising in its construction a cutting-off and spur-forming mechanism, a tilting or pivotally-supported anvil or bed, and a kicker or ejector for removing the completed toe-calk.

2. In a horseshoe toe-calk-making machine the combination with the tilting anvil and an adjustable stop $i$ moving with it, of a pair of dies engaging and pressing the material laterally to form the spur, a plurality of wiping or finishing rolls, $b^6$, $b^7$, for acting successively on the spur, and a rotary shaft carrying the said rolls.

3. The combination, with the pivoted anvil and means for tilting it, of the ejector or kicker, $f$, as set forth.

4. The combination with the tilting anvil and the adjustable stop, $i$, to move therewith, of the kicker or ejector, $f$, as set forth.

In testimony whereof I have signed my name to this specification, in the presence of two subscribing witnesses, this 14th day of September, A. D. 1896.

JOSEPH T. VARNEY.

Witnesses:
ARTHUR W. CROSSLEY,
ARTHUR F. RANDALL.